March 16, 1971   J. E. MacAFEE ET AL   3,570,320
TRANSMISSION SELECTOR APPARATUS
Filed April 30, 1969   4 Sheets-Sheet 3
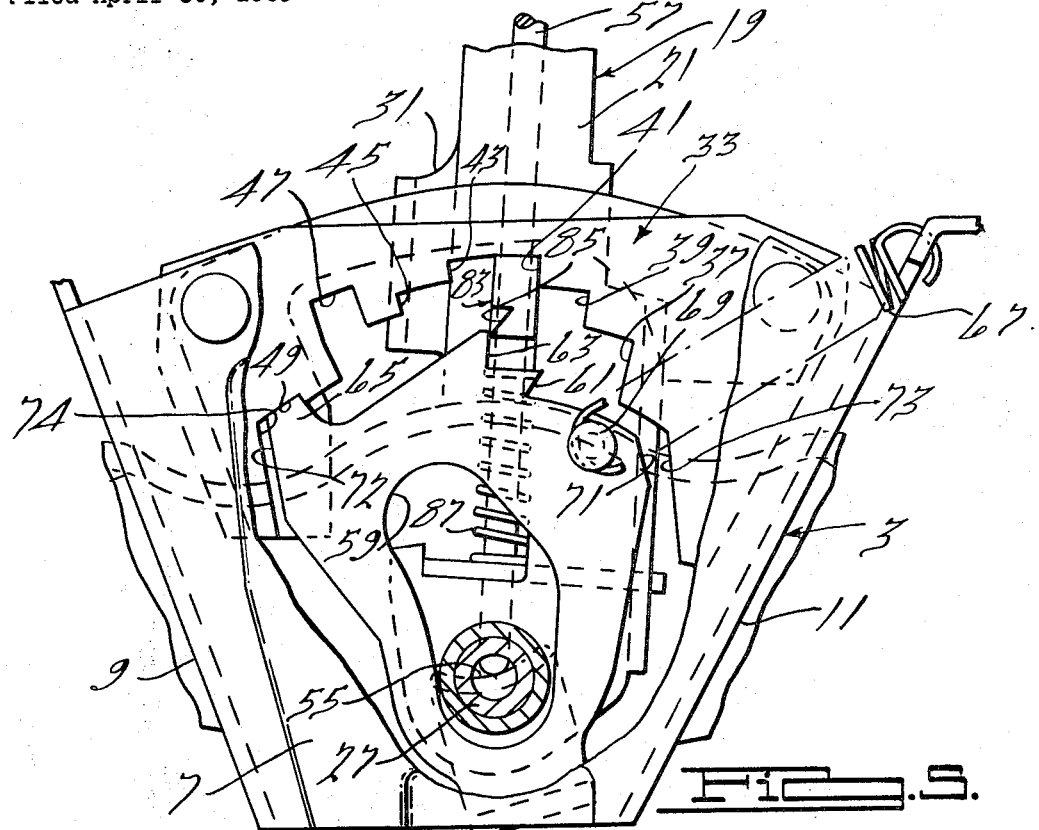
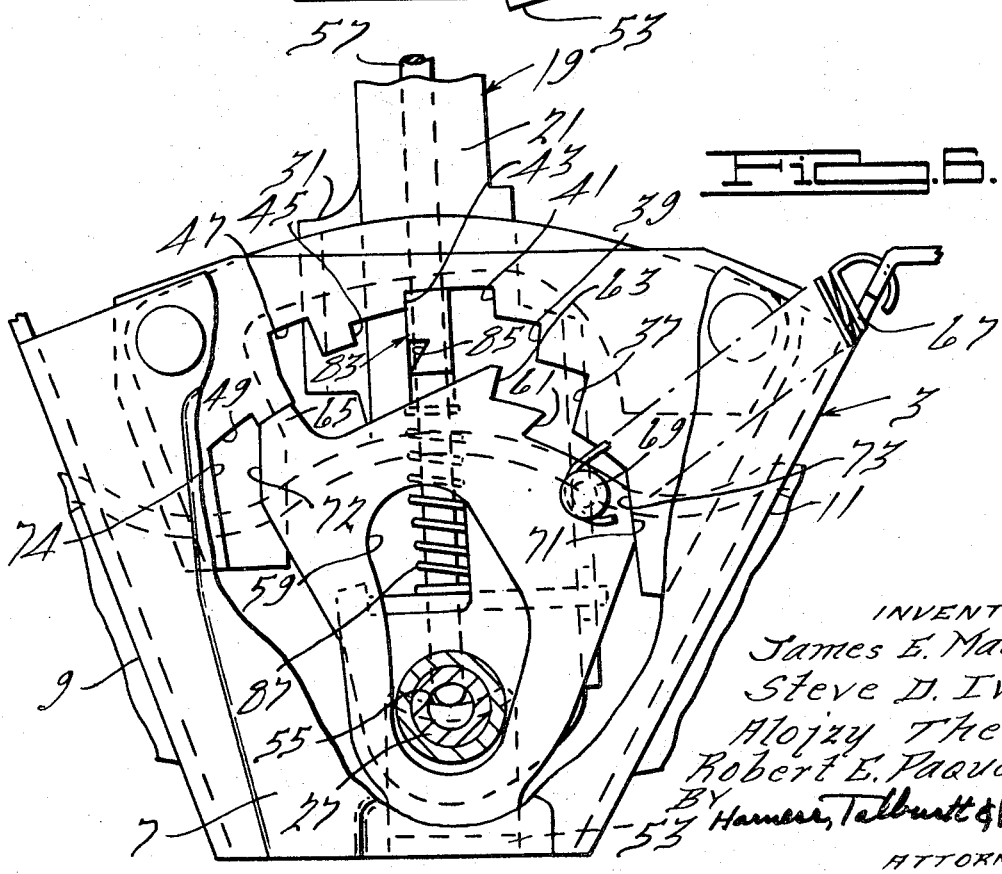
INVENTORS
James E. MacAfee
Steve D. Ivan
Alojzy Then
Robert E. Paquette, Jr.
BY Harness, Talburtt & Baldwin
ATTORNEYS.

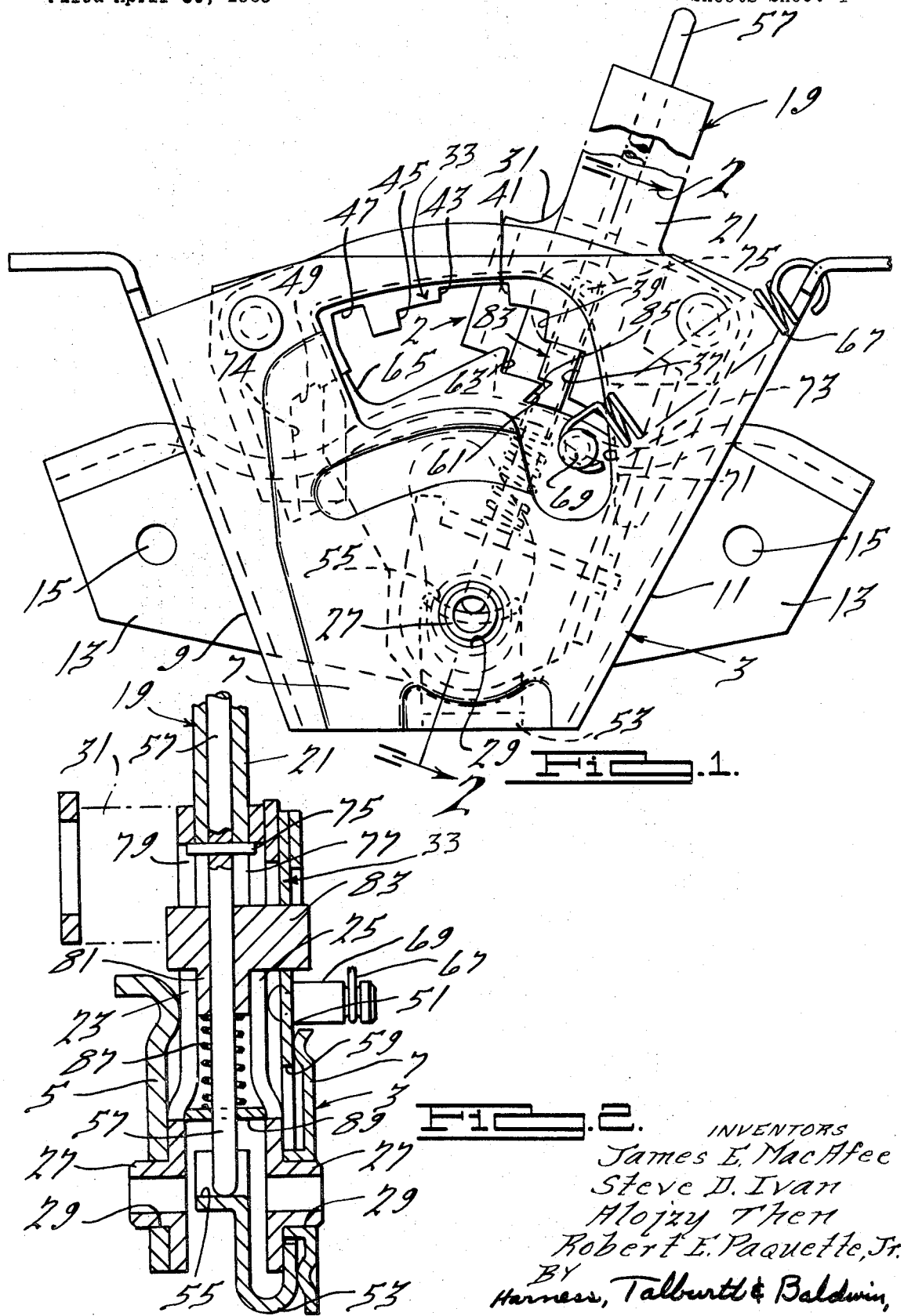

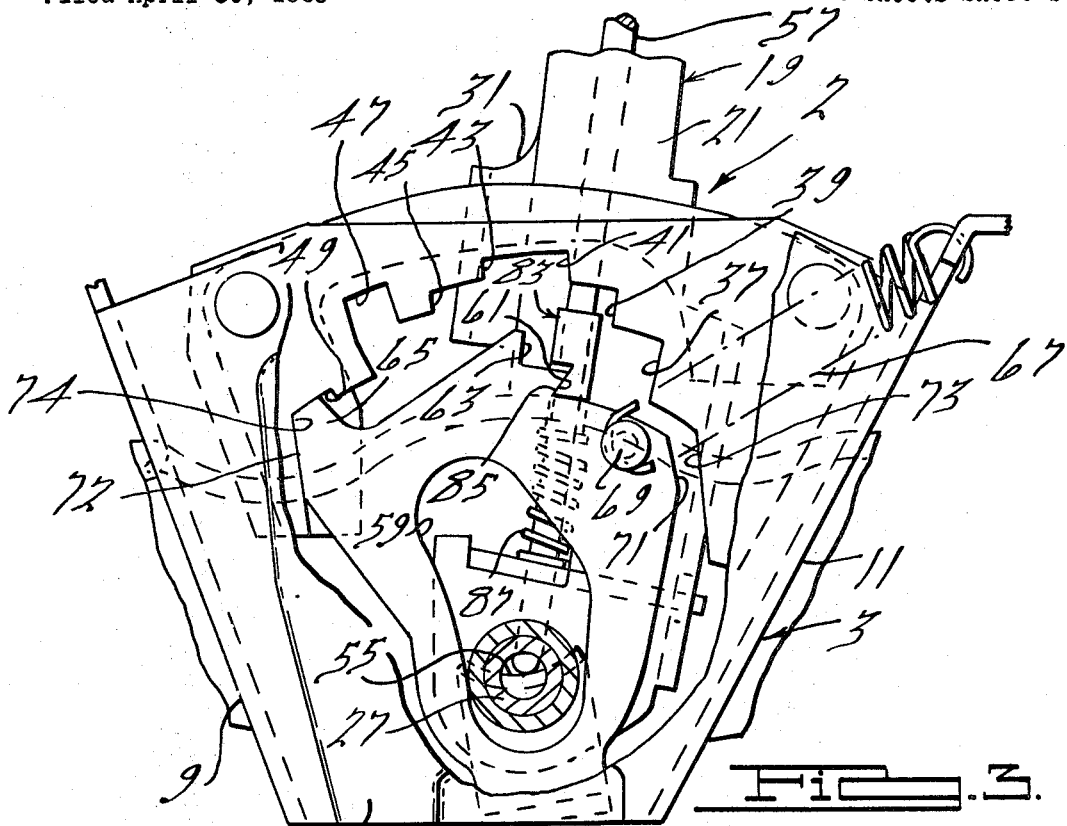
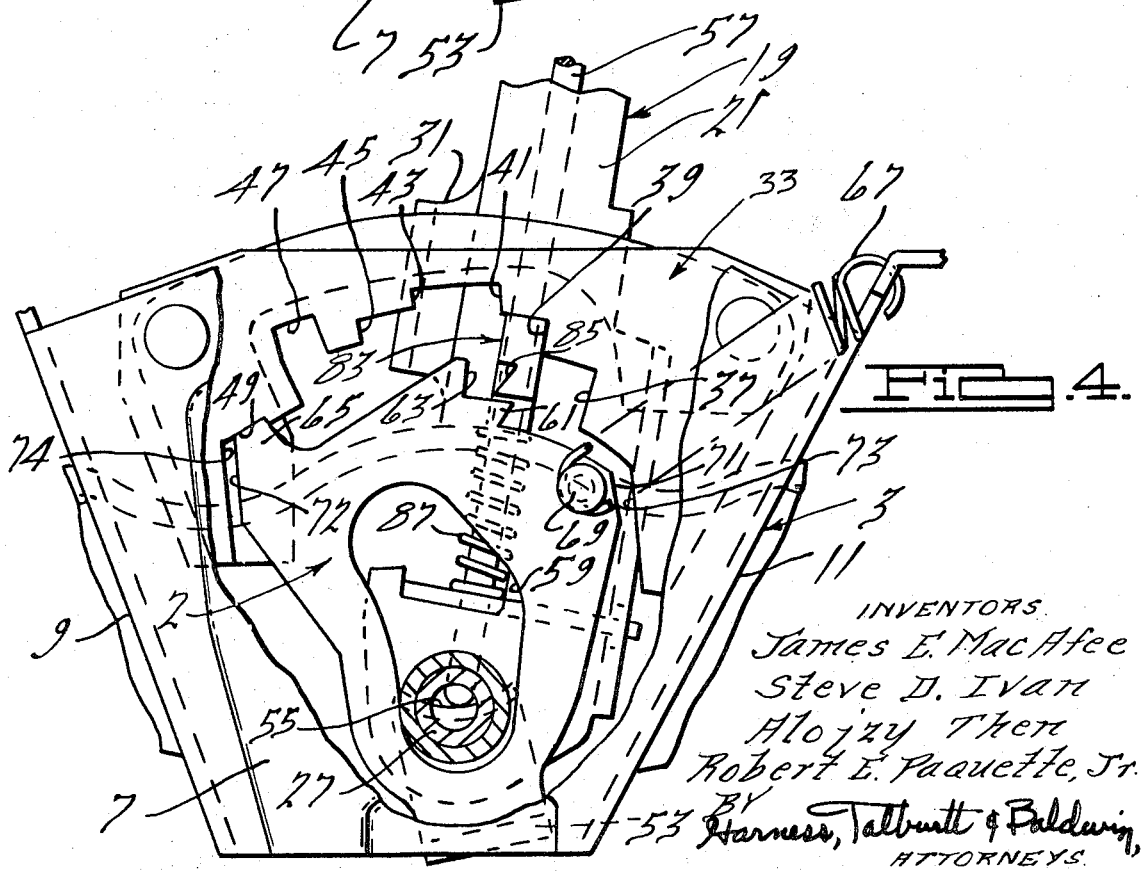

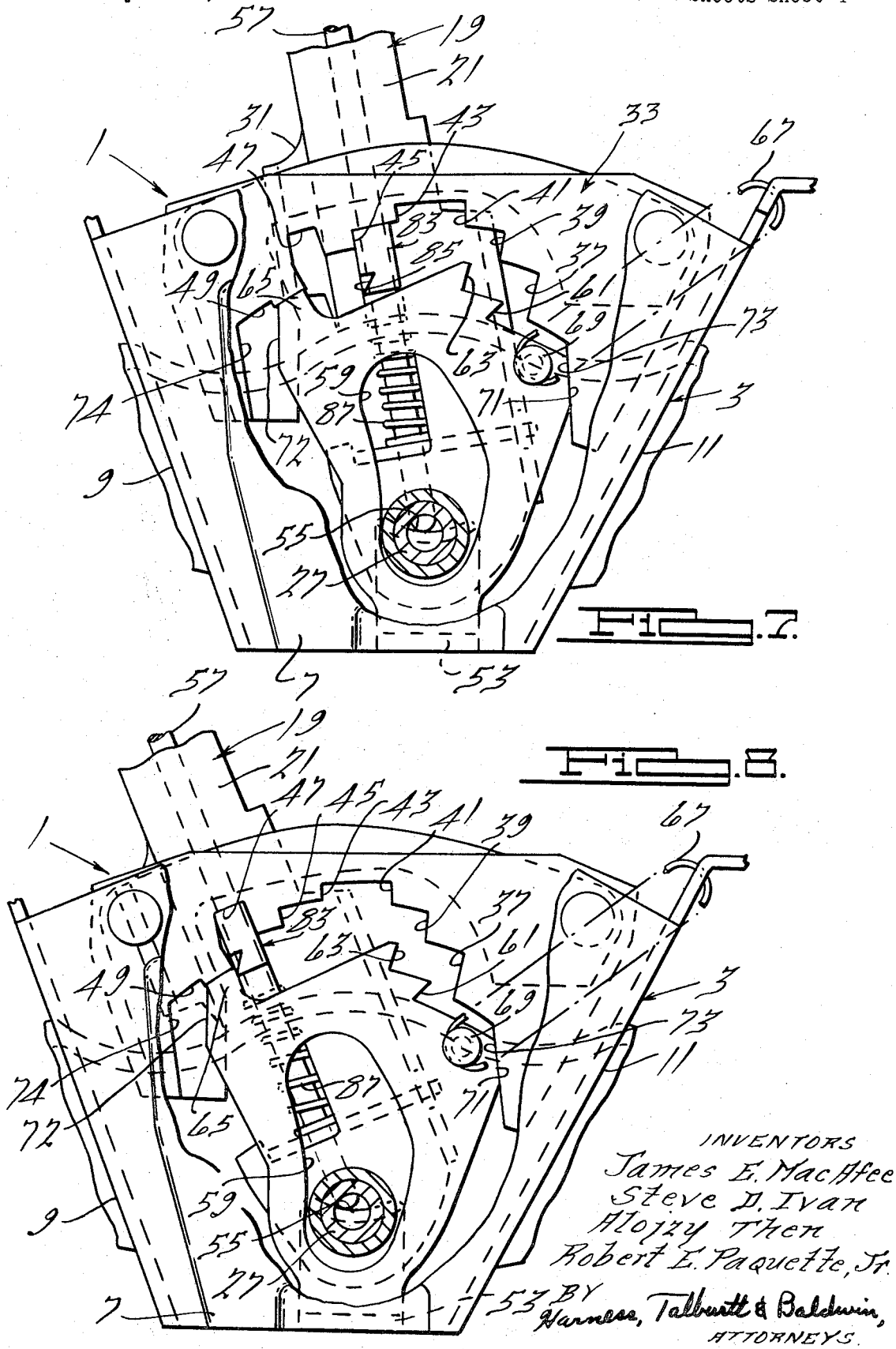

United States Patent Office 3,570,320
Patented Mar. 16, 1971

1

3,570,320
TRANSMISSION SELECTOR APPARATUS
James E. MacAfee, Troy, Steve D. Ivan, Roseville, Alojzy Then, Madison Heights, and Robert E. Paquette, Jr., Utica, Mich., assignors to Chrysler Corporation, Highland Park, Mich.
Filed Apr. 30, 1969, Ser. No. 820,425
Int. Cl. G05g 5/02
U.S. Cl. 74—473                                                                          11 Claims

ABSTRACT OF THE DISCLOSURE

Selector apparatus for an automatic transmission including a housing, a lever pivotally mounted in the housing, upper and lower gate members having a plurality of shoulders thereon. The gate members cooperate with a flag on said lever for releasably restraining movement of the lever from one position to another.

BACKGROUND OF THE INVENTION

This invention relates to gear shift mechanisms, and more particularly, to a console or floor mounted gear shift mechanism for an automatic transmission of a vehicle, such as an automobile.

Automatic transmissions have various drive conditions or ratios such as, for example, park, reverse, neutral, third, second and first. In the normal drive condition, the transmission upshifts from first to second and then from second to third automatically in response to vehicle speeds. Thus, the driver has no control over the selection of a ratio if the transmission is in the normal drive condition. It is desirable that transmission selector mechanisms be provided which will give the driver the option of shifting through first, second and third range selectively or automatically. To obtain some control over the particular ratio in which a transmission is at any particular vehicle speed, the driver must place the floor mounted selector in a particular range and hold the selector in that range until he desires to shift into another range. More particularly, when it is desired to first move the vehicle forwardly, the selector may be placed in the low or first driving range position The vehicle is then accelerated until the speed is attained at which the driver wishes to shift into second. At this speed the driver must move the selector into the intermediate or second driving range position. The vehicle is then accelerated again until the speed is attained at which the driver wishes to shift into third. The driver then moves the selector lever from second into direct drive or third driving range position. In most automatic transmission selector mechanisms, first driving range is located at one end of the path of movement of the selector lever, with second driving range being next to first, third driving range next to second, neutral next to third, reverse next to neutral and finally, park next to reverse at the other end of the path of movement of the selector lever.

Unless the driver has a very fine sense of feel for selector position or can accurately visually judge the exact amount of movement necessary to obtain a change in the transmission gear range, the driver is likely to overshoot a particular range, such as second, for example, when he upshifts from first, i.e., the driver in moving the selector lever out of its first position towards its second position, may move the selector lever right past second position into third range position, or even farther into neutral position, thus detracting from the ability of the transmission selector to be considered an efficient optional manual automatic or fully automatic transmission selector. Moreover, in conventional gear range selectors, the driver may

2 overshoot third, when upshifting from second to third, and again place the selector in neutral position. Certainly, if it is very difficult for the driver to place the selector in second and then third ranges after starting the vehicle in first range, the driver will not have a high opinion of the usefulness of the selector as a manual gear range selector. The mechanism of this invention overcomes many of the disadvantages of prior known devices.

SUMMARY OF THE INVENTION

Briefly, this invention comprises a lever and means for releasably preventing movement of the lever into a neutral position and also directly from a first position to a third position.

One of the primary objects of this invention is to provide a selector mechanism which prevents overshooting of the selector from a low range position to a higher range position.

Another object of this invention is to provide a selector of the class described which releasably locks the selector against movement from the third or direct drive range position into neutral.

A further object of this invention is to provide a device such as described which while preventing movement of the selector lever directly from first range position to third range position requires a minimum effort to permit movement of the lever from second range position to third range position.

Still another object of this invention is to provide a device of the type described which is adapted to be manually actuated when it is desired to move the selector from direct drive into neutral, reverse or park.

A further object of this invention is to provide a device such as described which is economical in construction and efficient in operation.

Other objects will be made apparent as the description progresses.

BRIEF DESCRIPTION OF THE DRAWINGS

In the accompanying drawings, in which one of various possible embodiments is illustrated, FIG. 1 is a side elevation of a device of this invention in one position;

FIG. 2 is a section taken along line 2—2 of FIG. 1; and

FIGS. 3–8 are similar to FIG. 1, illustrating the device in various operative positions.

Like parts are indicated by corresponding reference characters throughout the several views of the drawings.

DESCRIPTION OF THE PREFERRED EMBODIMENT

Referring now to the drawings, the apparatus of this invention is shown to include a housing or support 1 for a set of control means 2. Housing 1 is preferably formed of stamped members 3 and 5. Member 3 has a generally trapezoidal shaped wall portion 7 from two opposite sides of which extend front and rear walls 9 and 11. Connecting flanges 13 extend away from walls 9 and 11 and are connected to member 5 by fasteners 15. Ears 17 extend away from the upper ends of walls 9 and 11 and are adapted to be connected to the floor or console, for example, of an automotive vehicle.

Control means 2 includes a selector lever 19 for selecting a desired driving range condition. Lever 19 includes an elongated portion 21 having a pair of spaced apart arms 23 and 25 at the lower end thereof. Arms 23 and 25 have trunnions 27 extending from the lower ends thereof into mating openings 29 in members 3 and 5 for pivotally mounting the lever 19.

Lever 19 has an arm 31 thereon adapted to be connected to a conventional actuating mechanism (not shown)

for placing the transmission in any of its various modes. An upper gate 33 is attached to the inner side of wall 7 of member 3 and has a plurality of stepped shoulders and notches therein, aligned with an enlarged opening 35 in wall 7. In particular, gate 33 has a first shoulder 37, a second shoulder 39, a third, or direct drive shoulder 41, a neutral shoulder 43, a reverse shoulder 45, a park recess 47, and a lower gate locking recess and shoulder 49.

A floating lower gate 51 is located on the inner side of wall 7 and has a U-shaped lower portion 53 which straddles arm 25. The inner leg of the U-shaped portion 53 has a curved bearing surface 55 with which the lower end of an actuating rod 57, described more fully hereinafter, is engaged. Gate 51 has an enlarged opening 59 through which trunnion 27 of arm 25 passes. Along its upper edge gate 51 has an undercut or angled shoulder 61, a generally straight shoulder 63 and a locking shoulder 65. A spring 67 extends from one ear 17 to a pin 69 extending laterally from gate 51 and biases the gate toward the position shown in FIG. 1. In this position, a surface 71 on the end of gate 51 abuts a surface 73 on upper gate 33. As will be made apparent hereinafter, a surface 72 on gate 51 is adapted to abut a surface 74 on gate 33 when the lower gate is in its most counterclockwise position, as viewed in FIG. 3.

Rod 57 extends from bearing surface 55 upwardly through lever 19 to the upper end thereof. The bias exerted on gate 51 by spring 67 causes the rod 57 to be biased towards its uppermost position. A pin 75 extends through rod 57 and is adapted to slide in slots 77 and 79 in lever 19. Rod 57 also extends through a body 81 of a flag or blocking member 83 extending laterally from rod 57 through slots 77 and 79. Flag 83 has a notch 85 in the lower portion thereof adapted to receive and mate with angled shoulder 61 of lower gate 51. Flag 83 is biased upwardly by a spring 87 surrounding rod 57 and extending between flag body 81 and a shelf 89 extending between arms 23 and 25 of lever 19. The rod 57 is adapted to be moved downwardly manually by a conventional camming mechnism, not shown, when it is so desired as explained hereinafter.

Operation of the transmission driving range or mode is as follows:

It will be assumed that the parts are in the position shown in FIG. 1. In such position the arm 31 will place the transmission in a low driving range. It will be noted that flag 83 is adjacent shoulder 37 of gate 33 and that notch 85 and shoulder 61 are in a generally mated relationship. The upper end of flag 83 is in engagement with gate 33 between shoulders 37 and 39.

To shift the selector lever 19 into second position, it is moved forwardly, i.e., to the left, from its FIG. 1 position to the position shown in FIG. 3. During such movement, the notch 85 engages the shoulder 61 on lower gate 51 and swings the latter counterclockwise against the bias of spring 67. Counterclockwise movement of gate 51 and lever 19 is stopped by the engagement of surface 72 with surface 74. The locking shoulder 65 is also moved into locking recess and shoulder 49. As long as the force used to move the lever 19 from its FIG. 1 position to its FIG. 3 position is maintained, the various parts remain in their FIG. 3 position. The flag 83 is held in its FIG. 3 position against the bias of spring 87 by the interlocking relationship of notch 61 and shoulder 85. In the FIG. 3 position, the lever 19 and arm 31 will have placed the transmission in its second range driving mode.

When the force moving the lever 19 from its FIG. 1 position to its FIG. 3 position is released or terminated, the spring 67 tends to move gate 51 back towards its FIG. 1 position. However, the shoulder 65 engages the shoulder of recess and shoulder 49 and holds the gate 51 from further clockwise movement. Spring 87 then moves flag 83 upwardly to the position shown in FIG. 4 wherein the lower end of the flag is higher than shoulder 61. The lever 19 can then be swung to the left, as viewed in FIG. 4, from its FIG. 4 position. Just before the leading side of the flag 83 engages shoulder 63, the upper end of the flag has cleared shoulder 39 and the spring 87 pushes the flag upwardly to its FIG. 5 position. When the lever 19 is in the position shown in FIG. 5, the transmission will be in a direct drive mode.

It will be noted that even though spring 87 has moved flag 83 upwardly, the lower end of the flag is lower than the upper edge of shoulder 63. Thus a slight counterclockwise movement of lever 19 from its FIG. 5 position causes the surface 72 of gate 51 to engage surface 74 of gate 33, thus preventing further counterclockwise movement of the lever. This slight movement of lever 19 is insufficient to take the transmission out of a direct drive mode.

It will thus be seen that, starting from a first driving mode position, the lever 19 may be moved to a direct drive mode position by first passing through and stopping at a second driving mode position. Moreover, when the lever 19 is placed in the direct driving mode position, it cannot be swung out of such position into a neutral position due to the engagement of shoulder 63 with the flag 83 and due to the engagement of surfaces 72 and 74.

If it is desired to move the lever 19 to a neutral mode position, the actuating rod 57 must be depressed. The lower end of rod 57 engages bearing surface 55 and pushes the latter and gate 51 downwardly. The shoulder 65 is thus moved downwardly and it clears the shoulder of recess and shoulder 49. As soon as shoulder 63 clears the lower end of flag 83, spring 67 snaps gate 51 back to its FIG. 1 position. The lever 19 may now be moved to the position shown in FIG. 6 wherein the transmission is placed in a neutral condition.

The lever 19 may be moved from the neutral position shown in FIG. 6 to the reverse position shown in FIG. 7 by depressing actuating rod 57. As the rod moves downwardly, pin 75 engages flag 83 and moves the latter downwardly. When the flag clears shoulder 43, the lever may be swung to the FIG. 7 position. Similarly, when it is desired to move the lever into the park position, rod 57 is depressed to lower flag 83 below shoulder 45. The lever can then be moved to its FIG. 8 position. As soon as flag 83 becomes aligned with the recess 47, the spring 87 forces the flag up into the recess. When the rod 57 is depressed to permit movement of the lever 19 from neutral to reverse position, and from reverse to park position, the lower gate 51 is pushed downwardly but returns to its FIG. 1 position when the rod 57 moves back up into the lever.

The flag 83 may be moved out of the recess 49 by depressing actuating rod 57. This permits the lever to be swung clockwise from its FIG. 8 position, to and through its FIGS. 7 and 6 positions to its FIG. 5 position.

To move the lever 19 from its FIG. 5 direct drive position to either its FIG. 3 second drive position or its FIG. 1 first drive position, the actuating rod 57 must be depressed to lower flag 83 below shoulders 41 and 39.

In the event lower gate 51 is in the position shown in FIG. 6, for example, when the lever 19 is in the position shown in FIG. 4, for example, counterclockwise movement of the lever causes flag 83 to swing lower gate 51 counterclockwise against the bias of spring 67 until the shoulder 65 of gate 51 drops into the locking recess 49, in the position shown in FIG. 5.

It will thus be seen that the apparatus of this invention permits shifting of the transmission from a low or first driving mode to second and then to third or direct drive without overshooting the latter position to inadvertently place the transmission in neutral.

In view of the foregoing, it will be seen that the several objects of this invention are achieved.

Although only one embodiment of the invention has been disclosed and described, it is apparent that other embodiments and modifications of the invention are possible.

We claim:

1. Apparatus for shifting an automatic transmission between a first, a second, and a third drive condition, and a neutral condition, comprising a support, a shifting lever adapted to be connected to the transmission, means pivotally connecting said lever to said support for swinging movement of said lever in a plane between first, second, third and neutral positions which correspond to the first, second, third and neutral drive conditions of the transmission, and control means for releasably retaining said lever in said second position as the latter is moved in said plane from said first position toward said third position, and for releasably blocking movement of said lever in said plane from said third position into said neutral position.

2. Apparatus for shifting an automatic transmission between a first, a second, and a third drive condition, and a neutral condition, comprising a support, a shifting lever adapted to be connected to the transmission, means pivotally connecting said lever to said support for swinging movement of said lever between first, second, third and neutral positions which correspond to the first, second, third and neutral conditions of the transmission, and control means for releasably retaining said lever in said second position as the latter is moved from said first position toward said third position, and for releasably blocking movement of said lever from said third position into said neutral position, said control means including an upper gate, a lower gate, and a member movable with said lever and movable relative to said lever, said member extending between said gates, one of said gates being secured to said support, the other of said gates being movable relative to said support, said member moving said other gate when the lever is moved from said first position to said second position.

3. Apparatus for shifting an automatic transmission between a first, a second, and a third drive condition, and a neutral condition, comprising a support, a shifting lever adapted to be connected to the transmission, means pivotally connecting said lever to said support for swinging movement of said lever between first, second, third and neutral positions which correspond to the first, second, third and neutral conditions of the transmission, and control means for releasably retaining said lever in said second position as the latter is moved from said first position toward said third position, and for releasably blocking movement of said lever from said third position into said neutral position, said control means including an upper gate connected to said support, a lower gate movable relative to said support and said upper gate, said upper gate having a plurality of shoulders, said lower gate having a first shoulder, a flag, means mounting said flag for movement with said lever and also relative to it, said flag engaging said first shoulder on said lower gate and moving the latter when a force is applied to said lever to move it from its first position to its second position, said lower gate preventing movement of said flag and said lever from said second position to said third position until said force is released.

4. Apparatus as set forth in claim 3 wherein said lower gate has a second shoulder thereon, said second shoulder in said lower gate being engageable by said flag when a force is applied to said lever in a direction to attempt to move the lever from said third position towards its neutral position, and preventing movement of said flag and lever to said neutral position.

5. Apparatus as set forth in claim 4 wherein said means mounting said flag for movement with said lever and also relative to it comprises a rod slideably mounted in said lever, said flag being slideably mounted on said rod, and means on said rod for engaging said flag when said rod is moved downwardly in said lever.

6. Apparatus as set forth in claim 5 wherein said lower gate has a bearing surface thereon, the lower end of said rod engaging said bearing surface, said lower gate, when said lever is in said third position and said rod is depressed, being lowered to move said second shoulder of said lower gate out of the path of said flag to permit movement of said lever to its neutral position.

7. Apparatus as set forth in claim 3 including a spring biasing said flag upwardly, said spring moving said flag upwardly when the lever is in said second position and said force is released.

8. Apparatus as set forth in claim 3 wherein said upper gate has a locking recess therein, said lower gate having a locking shoulder thereon, said locking shoulder being moved into said locking recess when said flag moves said lower gate upon the application of said force.

9. Apparatus as set forth in claim 3 wherein said first shoulder on said lower gate has an undercut therein, said flag having a notch therein generally mating with said first shoulder on said lower gate.

10. Apparatus for shifting an automatic transmission between a first, second, and third drive condition, and a neutral condition, comprising a support, a shift lever adapted to be connected to the transmission, said shift lever being connected to said support and movable between first, second, third and netural positions, and means releasably preventing movement of said lever into said neutral position from said third position, said means including blocking means normally blocking movement of said lever into neutral position, and means connected to said lever for moving said blocking means to an unblocking position to permit movement of said lever to said neutral position.

11. Apparatus as set forth in claim 10 wherein said blocking means includes means for preventing movement of said lever directly from said first position to said third position.

References Cited

UNITED STATES PATENTS 3,292,450   12/1966   Hurst et al. _____ 74—473

MILTON KAUFMAN, Primary Examiner